C. H. HUNT.
ROLLING MILL SPINDLE COUPLING.
APPLICATION FILED MAY 23, 1914.
1,115,433.
Patented Oct. 27, 1914.
3 SHEETS—SHEET 1.
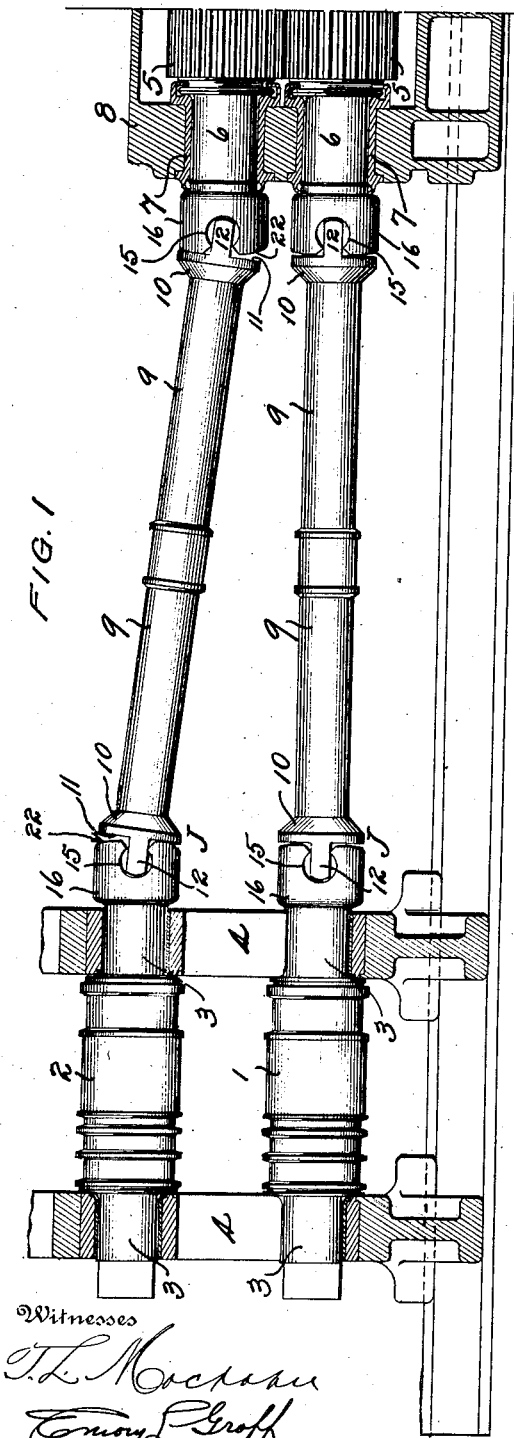
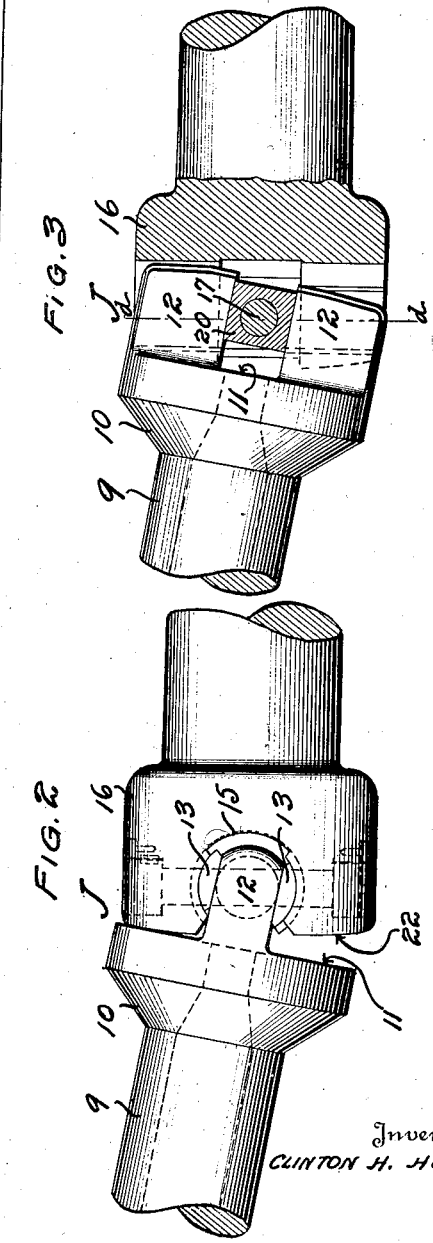
Witnesses
Inventor
CLINTON H. HUNT
By W. C. Carman
his Attorney

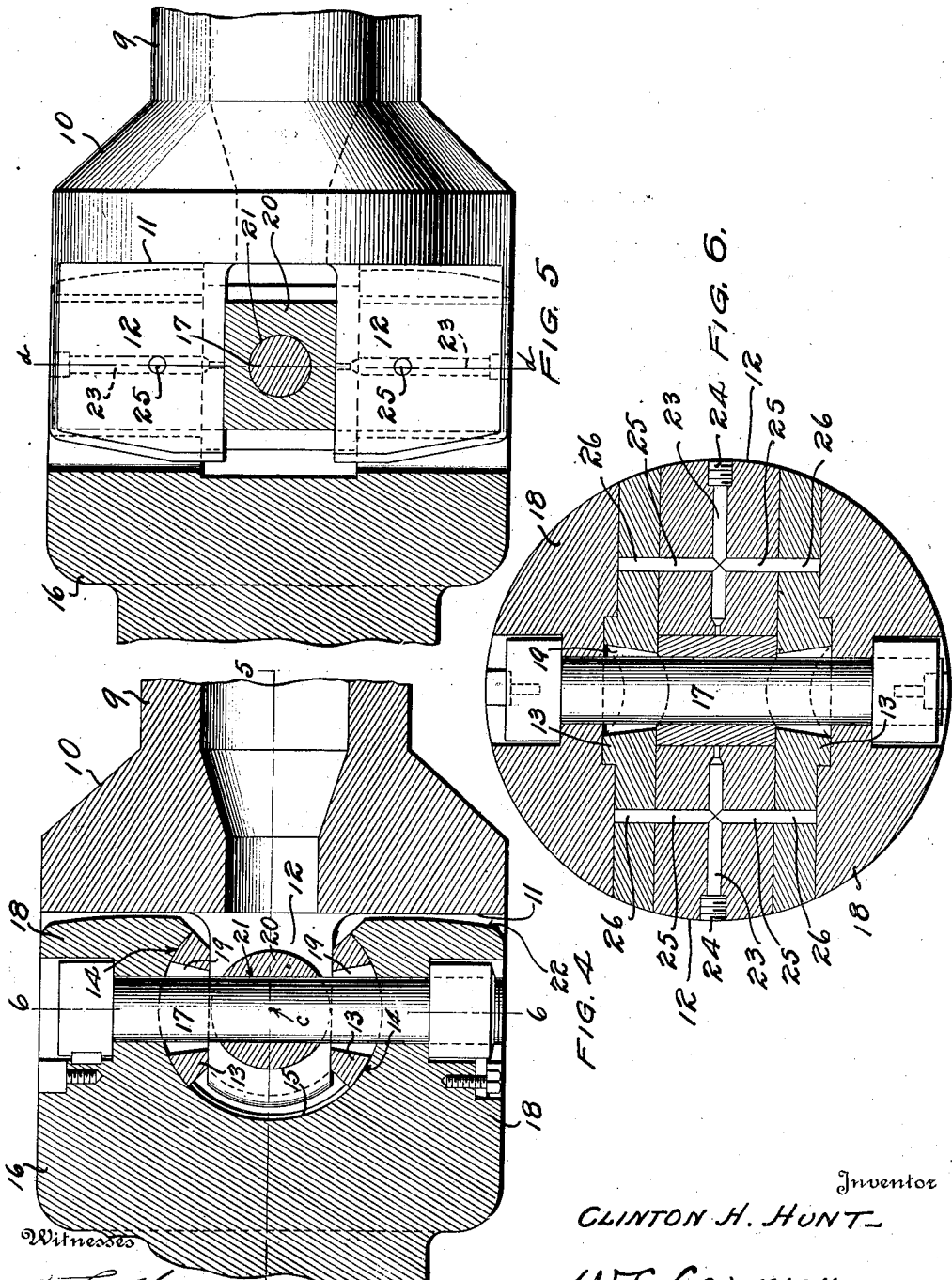

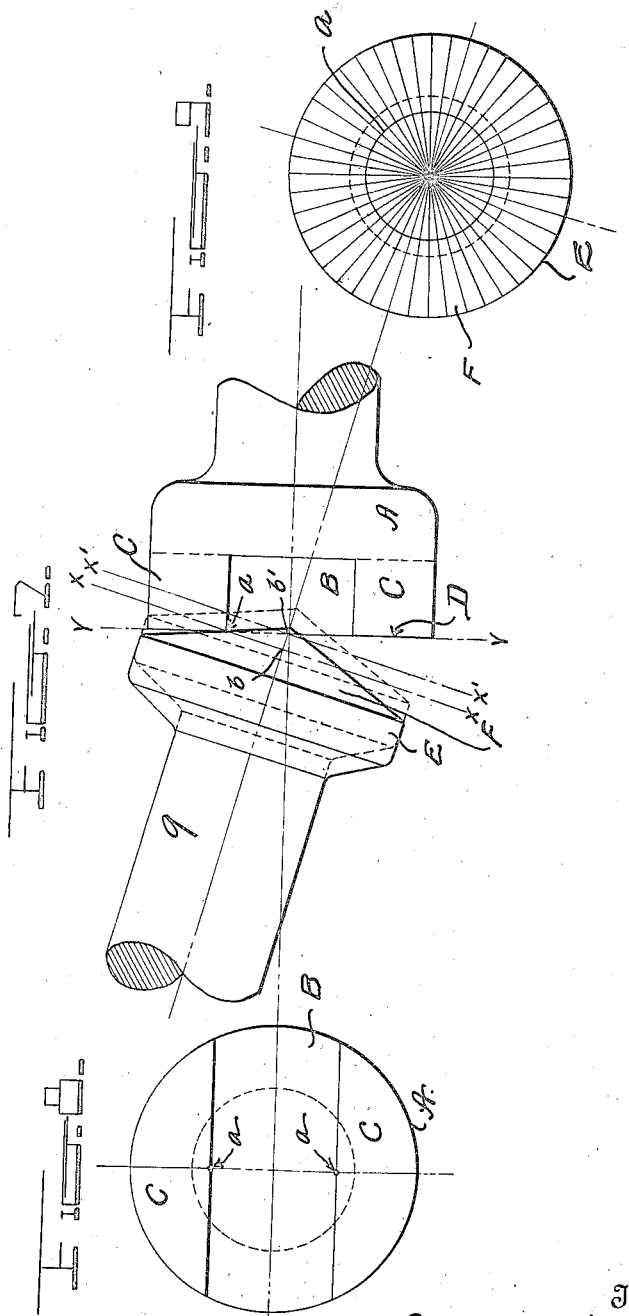

UNITED STATES PATENT OFFICE.

CLINTON H. HUNT, OF YOUNGSTOWN, OHIO, ASSIGNOR TO THE WILLIAM TOD COMPANY, A CORPORATION OF OHIO.

ROLLING-MILL SPINDLE-COUPLING.

1,115,433.   Specification of Letters Patent.   Patented Oct. 27, 1914.

Application filed May 23, 1914.   Serial No. 840,402.

*To all whom it may concern:*

Be it known that I, CLINTON H. HUNT, a citizen of the United States, residing at Youngstown, in the county of Mahoning and State of Ohio, have invented certain new and useful Improvements in Rolling-Mill Spindle-Couplings, of which the following is a specification.

This invention relates to that class of shaft couplings which are specially designed and adapted for rolling mill apparatus and which are known as spindle couplings to connect the drive pinions with the rolls for the purpose of rotating the latter.

To this end, the invention contemplates a novel and practical improvement in spindle couplings particulary adapted for use in connection with rolling mills of the two-high or three-high type, the rolls of which require frequent adjustment in a vertical direction to accommodate the various sizes of blooms, bars, plates and so on being operated upon; and, as a special feature of improvement, the invention has in view a specially designed formation and combination of contacting bearing surfaces between the two jointed members of the coupling in order to overcome and eliminate certain objectionable characteristics of that type of spindle coupling exemplified, for instance, by United States Letters Patent No. 1,041,773, issued to Harry R. Geer on October 22, 1912. In this patented type of spindle coupling the spindle head, from which projects the rectangular knuckle pieces or projections, is formed with a conical end bearing surface, while the opposing end bearing surface on the head of the roll-neck or pinion-neck (which constitutes the journal element) is flat and disposed at right angles to the longitudinal axis of the roll or pinion. This formation and relation of contacting bearing surfaces between the two members of the coupling give rise to a number of objections which seriously interfere with an economical and proper maintenance and operation of the mill. One of the more important of these practical objections is the fact that the two bearing surfaces will roll properly in contact only when there is a line contact between the surfaces, and this will occur only when the angle of inclination of the spindle, caused by the adjustment of the roll, is equal to the angle between the two end or bearing surfaces when the spindle is horizontal, while, in less angular positions, a non-uniform alternating contact between these surfaces produces a longitudinal reciprocation or vibration of the spindle, which is very detrimental to the running thereof. Furthermore, by reason of the relation of the conical surface on the spindle end to the flat surface on the journal element of the driving pinion-neck, as the roll is lifted, the spindle gravitates in the direction of the pinion, thereby reducing the area of contact between the interengaged coupling parts at the roll end of the spindle and causing those parts to wear away more rapidly than the corresponding parts at the pinion end of the spindle, so that a proper alinement cannot be maintained between the pinion shaft and the roll. It is also very difficult to machine a conical surface between the knuckle projections on the ends of the spindle, and while this is not absolutely necessary, it is very desirable in order to provide smoothly working contact surfaces.

Accordingly, the present invention has primarily in view an improved construction of spindle coupling which admits of the parts being properly and readily machined, eliminates the longitudinal reciprocation or vibration of the spindle, and maintains a practically uniform bearing or contact relation between the coupling parts at both ends of the spindle, thereby allowing the spindle to work through a greater angular variation and equalizing the wear of the coupling parts at both ends.

With these and many other objects in view which will be readily noted by those familiar with this particular class of couplings, the invention consists in the novel construction, combination and arrangement of parts hereinafter more fully described, illustrated and claimed.

The preferred embodiment of the invention is shown in the accompanying drawings, in which—

Figure 1 is an elevation of a blooming mill illustrating the improved spindle coupling between the rolls of the mill and the drive pinions, the upper roll of the mill being elevated to an extreme position to show the angular position assumed by the coupling spindle. Fig. 2 is a detail elevation of the improved coupling illustrating the axis of the spindle disposed at an angle to the axis of the roll or pinion shaft with which it connects. Fig. 3 is a sectional elevation with the parts having the same angular relation as shown in Fig. 2, but rotated ninety degrees from the position in that figure. Fig. 4 is an enlarged sectional view through the coupling, showing the longitudinal centers of the roll or pinion shaft and the spindle coincident. Fig. 5 is a sectional elevation on the line 5—5 of Fig. 4, but with the coupling rotated ninety degrees from the position shown in that figure. Fig. 6 is a cross section of the coupling on the line 6—6 of Fig. 4. Fig. 7 is a diagrammatic elevation illustrating the faulty action of that type of coupling upon which the present invention is designed as an improvement. Figs. 8 and 9 are diagrammatic face views of the separate coupling members illustrated in Fig. 7.

Like reference characters designate corresponding parts in the several figures of the drawings.

Fig. 1 shows a rolling mill apparatus, including the usual rolls 1 and 2 (of a two-high mill) having the journal elements or necks 3 turning in the bearings mounted in the roll housings 4, and the conventional drive pinions 5—5 with the journal elements or necks 6 turning in the bearings 7 mounted in the pinion housing or frame 8. These pinions are driven in the ordinary manner by suitable power, and in turn drive the rolls through the medium of the spindle couplings, each of which couplings connects one of the pinions with one of the rolls. Each coupling consists of the connecting spindle 9 and a gimbal coupling joint J between opposite ends of the spindle and the roll and pinion necks 3 and 6, respectively; and as the joints J are duplicates in construction and action, one description will suffice. Referring particularly to the detail construction of said coupling joint, it will be observed that the spindle element 9 is formed with a coupling member or head 10, preferably of circular formation, and provided with a flat end bearing surface 11 which lies in a plane at right angles to the axis of the spindle, and from which projects a pair of spaced knuckle projections 12. These knuckle projections are preferably rectangular in cross section and are disposed in planes parallel to the axis of the spindle and adapted to slidably engage between the oppositely arranged bearing slippers 13. The bearing slippers 13 are arranged in opposite positions and are formed with external convexed faces slidably fitting the correspondingly concaved bearing surfaces 14 of the opposite walls of the joint socket 15 which receives the knuckle projections 12 of the spindle element.

The joint socket 15, which accommodates the oscillatory bearing slippers 13 with the knuckle projections 12 between them, is formed by bifurcating the coupling member or head 16 on the journal element (3 or 6) of the coupling. In order to maintain the interengaging parts in proper coupled relation, a coupling bolt 17 is passed through alined openings in the cheek blocks 18—18 of the coupling head 16 and also through enlarged clearance openings 19 formed in the bearing slippers 13, said openings 19 being flared and sufficiently large to permit of the necessary oscillation for the slippers. A spacing block 20 is interposed between the knuckle projections 12, and is provided with a bolt hole 21 to receive the joint bolt 17, said spacing block serving to brace and support the interengaging parts in proper relation in all positions thereof.

A distinctive and important feature of the present invention is that of forming the end of the coupling member or head 16 for the journal element (3 or 6) with a convexed end bearing surface 22. The curvature of this bearing surface 22 is distinctly of an oblate spherical or spheroidal character, and the generating curves of this surface radiate from the center toward all points on the circumference. It is this oblate spherical or spheroidal surface against which the flat surface of the spindle end bears and rotates, and secures the various objects and advantages hereinbefore indicated.

Effective lubrication of the entire coupling joint may be conveniently and satisfactorily effected by providing the knuckle projections 12 with oil chambers 23 having their outside ends closed by filler plugs 24 and having radiating passages 25 in communication with oil holes 26 piercing the slippers 13. The oil chambers 23 have their inner ends open on to the bearing surfaces between the inner faces of the knuckles 12 and the flat ends of the spacing block 20. The passages 25 and holes 26 provide for supplying lubricant to both faces of the bearing slippers 13, all of which will readily appear from an inspection of Fig. 6 of the drawings.

Since the distinguishing and characteristic feature of the invention resides in forming the end of the journal element for the roll or pinion with an oblate convexed bearing surface opposing a flat bearing surface at the adjoining end of the spindle in order to provide and maintain a uniform and constant contact therebetween, the more striking and practical advantages of this construction are emphasized by reference to the group of diagrammatic views of Figs. 7, 8 and 9 of the drawings. These diagrammatic views represent the patented type of spindle construction hereinbefore referred to, and for the purpose of this diagram, Fig. 7 illustrates the adjoining ends, to be coupled, of the roll or pinion and of the spindle, the axes of these separate elements being angularly related as indicated. In this figure of the drawings the letter A designates the coupling member at the end of the roll or pinion, said coupling member being bifurcated as indicated at B, and forming the oppositely arranged cheek blocks C. The end of this coupling member A is provided with an end bearing or contact face D, the plane of which is represented by the line Y—Y, and is disposed at right angles to the longitudinal axis of the roll or pinion. The complementary coupling E at the end of the connecting spindle 9 carries the knuckle projections which are interlocked with the coupling member A in the manner shown in the patent referred to. These coupling projections are not shown in this figure, being omitted for the purpose of illustrating the action of the face from which they project, said face being designated by the reference letter F, and being truly conical. It has already been pointed out that in a coupling of this construction, where the end of the spindle is of conical formation and the roll or pinion end is flat, these surfaces will roll properly in contact only when the angle of inclination of the spindle is equal to the angle between the two end surfaces when the spindle is horizontal. When the spindle is working at a lesser angle we have the condition which is illustrated by the diagram of Fig. 7. Noting the example furnished by this diagram, the reference character $a$ designates the point of contact of the roll or pinion end with the conical surface F on the spindle end, which point on the spindle end, during one revolution of the coupling, describes a circle all points of which are in a plane (X—X Fig. 7) at right angles to the axis of the spindle. The corresponding point of contact on the roll or pinion end rotates in the plane Y—Y at right angles to the axis of the roll or pinion. This point is in contact alternately with each of the opposite cheek blocks C of the roll or pinion end throughout one-half of the revolution, and it is evident that as the point $a$ on the pinion end rotates from the vertical to the horizontal plane, point $b$ on the conical surface of the spindle end must shift to the point designated by $b'$ within the plane X'—X', so that the spindle end takes the position shown by the dotted lines. As suggested on page 1, this produces a reciprocal movement of the spindle twice each revolution, and reduces the area of contact between the interengaged coupling parts at the roll end of the spindle, thus causing a non-uniform wearing of those parts.

By comparison with the foregoing, it will now be readily understood that the novel combination and character of surfaces 11 and 22, which are important features of the present invention, involve a construction wherein the spindle end, with its flat bearing surface, can be easily machined on a planer, and the spherical or spheroidal end of the roll or pinion can be easily machined on a lathe, since the roll or pinion end is usually cast with a bridge of metal connecting the inner surfaces of the knuckle projections at their outer ends to serve for centering the same when turning, which metal bridge is afterward removed when finishing the inner surfaces of the projections. It is apparent that this construction allows a perfectly machined contact or bearing surface on the roll or pinion end, against which the machined end surface of the spindle bears and rotates when the spindle has shifted longitudinally toward the pinion, caused by the lifting of the roll as heretofore explained. Furthermore, it will be noted that as the upper mill roll is raised, and the angularity of the spindle increases, the point of contact between the journal element and the end of the spindle moves out toward the outer circumference, and the path of contact on each surface is always a circular one which is concentric with the axes of the journal and spindle elements, thereby producing a perfect rolling contact, between the two surfaces, and practically eliminating the longitudinal vibration or reciprocation of the spindle, as described and shown to exist in the patented type of coupling heretofore referred to.

In further explanation of the action involved with my improved coupling, reference will be made to Fig. 4 of the drawings, wherein $c$ is the center of oscillation of the bearing slippers, and in Fig. 5 the line $d$—$d$ may be regarded as being described on the surface of the knuckle projections of the spindle end, said line being perpendicular to the axis of the spindle and lying in a plane passing through the center $c$ perpendicular to the axis of the roll or pinion when the longitudinal axis of the spindle and the roll or pinion are coincident, and when the working clearance is equally divided between the ends of the spindle and the roll and pinion. As the upper roll is raised and the spindle assumes the angular position shown in Figs. 1, 2 and 3, the flat surface of the end of the spindle comes in contact with the convex surface of the pinion end, due to the spindle shifting endwise so that all the working clearance comes at the roll end of the spindle, and the convex surface is so formed that as the angle of the spindle to the horizontal axis of the pinion increases, the line $d$—$d$ is drawn outward toward the end of the pinion, as in Fig. 3, an amount equal to half of the theoretical increase of the length of the spindle, so that the bearing surface between the slippers and the rectangular projections on the spindle is the same at the roll end as at the pinion end, excepting a slight difference due to the working clearance at the roll end, and this working clearance is constant for all angular variations of the spindle when working within its proper limits.

From the foregoing, it is thought that the construction, operation and many advantages of the herein described improvement in spindle couplings for rolling mills will be readily apparent without further description, and it is also to be understood that while the coupling is shown and illustrated in connection with a two-high rolling mill, it is equally applicable to a three-high or other style of rolling mill, and in fact to any apparatus or machine in which it is desired to transmit rotating motion through an angular position.

I claim:

1. A spindle coupling of the class described, including in combination, the journal element of the roll or pinion provided with a coupling member having an oblate convexed end bearing surface, and the spindle element having a coupling member slidably jointed to said other coupling member and provided with a flat end bearing surface opposing said convex surface.

2. A spindle coupling of the class described, including in combination, a journal element provided with a bifurcated coupling member having an oblate convexed end bearing surface, and a spindle element having a coupling member provided with knuckle projections slidably inter-locked with said bifurcated coupling member, and provided with a flat end bearing surface opposing said convex surface.

3. A spindle coupling of the class described, including in combination, a journal element provided with a coupling member having an oblate spheroidal end bearing surface, and a spindle element having a coupling member universally jointed with said other coupling member and provided with a flat end bearing surface lying in a plane at right angles to the axis of the spindle element and opposing said spheroidal bearing surface.

In testimony whereof I hereunto affix my signature in the presence of two witnesses.

CLINTON H. HUNT.

Witnesses:
   D. F. ZOLLNER,
   L. E. TAYLOR.